Sept. 22, 1964 B. FOX 3,149,894

ELECTRICAL CONTACT FOR PRINTED CIRCUIT BOARD

Filed April 22, 1958

INVENTOR
BENJAMIN FOX
BY Harry Langsam
Stanley Bilker
ATTORNEYS 3,149,894
ELECTRICAL CONTACT FOR PRINTED CIRCUIT BOARD Benjamin Fox, 403 Gribbel Road, Wyncote, Pa.

Filed Apr. 22, 1958, Ser. No. 730,227
9 Claims. (Cl. 339—17)

My invention relates to quick detachable connectors having contacts of the type shown in my patents Re. 23,547 of September 9, 1952 and Patent No. 2,750,572 of June 12, 1956.

In the aforementioned patents, bifurcated contact members were adapted to interfit with similar bifurcated contact members to provide good electrical connections and to be quickly connected or disconnected.

The primary object of the present invention is to mount a plurality of bifurcated contact members on a single board such as those used in printed circuits and to have a complementary printed circuit board with interfitting bifurcated contact members. The bifurcated connectors are adapted to interfit with similar or complementary bifurcated connectors, each set of complementary connectors being mounted at an angle of 45° to the plane of the board.

Another object of my present invention is to mount quick detachable electrical contact members upon a printed circuit board whereby the contacts are self-locking and self-sustaining, and wherein additional securing means may be used both to hold and to guide the separable printed circuit board members of the connector.

Another object of my invention is to mount quick detachable contacts on printed circuit boards whereby the boards are mounted either in the same plane or in planes extending at a right angle to one another.

Other objects of my invention are to provide an improved device of the character described, that is easily and economically produced, which is sturdy in construction, and which is highly efficient in operation.

With the above and related objects in view, my invention consists in the details of construction and combination of parts, as will be more fully understood from the following description, when read in conjunction with the accompanying drawings, in which.

Figures 1, 2, 3, 5, 6:
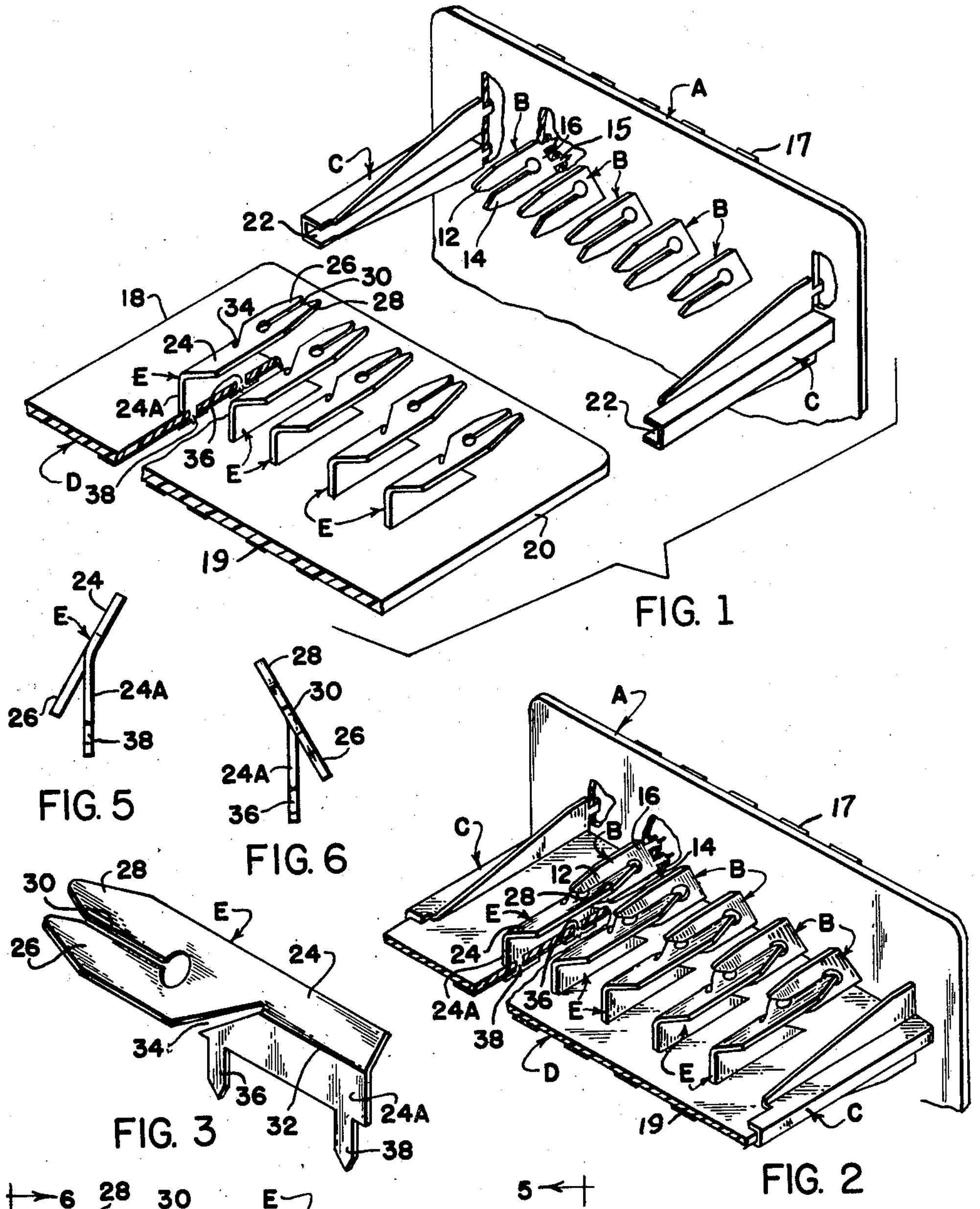
FIG. 1 is a perspective view of a plurality of quick detachable, bifurcated, electrical contacts mounted upon a printed circuit board wherein one board is mounted at 90° to another printed circuit board and wherein the electrical connectors are bifurcated and mate one with the other, all in accordance with my present invention.
FIG. 2 is a perspective view of two printed circuit boards having bifurcated connectors coupled together in accordance with my present invention.
FIG. 3 is a perspective view of one of the bifurcated contacts itself.
FIG. 5 is an end view of the contact as seen from the plane of the line 5—5 of FIG. 4.
FIG. 6 is a front view of the contact taken along the lines 6—6 of FIG. 4.
Figure 4:
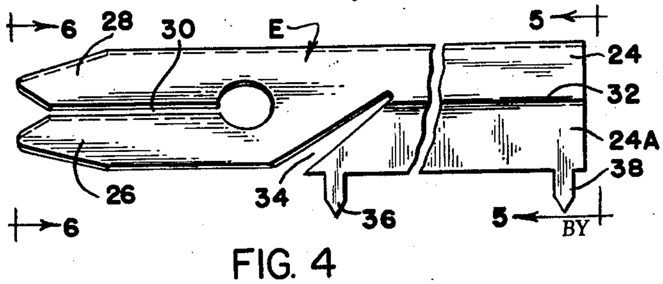
FIG. 4 is a side view of the bifurcated electrical contact shown in FIG. 3.

Referring now in greater detail to the drawings, wherein similar reference characters refer to similar parts, I show in FIG. 1 a printed circuit board, generally designated as A, on which there is mounted a plurality of bifurcated electrical contacts, generally designated as B, extending at 90° to the plane of the board. Each electrical contact B has a pair of bifurcated legs 12 and 14 extending from the body portion 16. Holding legs 15 also extending from the body are peened over to engage a body of conducting material 17 which is mounted on the opposite side of the board.

Mounted upon the board A to project at an angle of 90° to the plane of the board, adjacent to the row of electrical contacts B, are two U-shaped guides and holders, each being generally designated as C, to support and hold another printed circuit board, generally designated as D, which carries a plurality of conductive strips 19 on one surface thereof. The parallel side edges 18 and 20 of the board D fit within the U-shaped slots 22 of the U-shaped guide and holders C to hold the boards at right angles to one another (see FIGS. 1 and 2). Mounted in alignment upon the opposite surface of the printed circuit board D are a plurality of spaced, bifurcated electrical contacts, each of which is generally designated as E, and which interfit with the bifurcated contacts B on the printed circuit board A.

The electrical contacts E have a flat body portion 24 which terminates in a bifurcated portion having two arms 26, 28 having beveled edges 30 that serve as contact areas. These bifurcated contact legs are of the same type as disclosed in my prior patents Re. 23,547 and Patent No. 2,750,572. A flat portion 24A of the flat body 24 extends at an angle of 135° to the main body portion 24 and a partial transverse slot 34 extends to the bending line 32 between the main body portions 24 and 24A.

The flat contact legs 26, 28 protrude at an angle of 45° to the plane of the insulator board D because a portion of the body is divided along the line 32 to extend at an angle of 135° to the remainder of the body. The contact legs 26, 28 extend lengthwise in directions substantially parallel to the axis or length of the board D. The flat portion 24A of the body 24 is bent along the longitudinal line 32, which is in substantially the same longitudinal axis as the slot between the legs 26, 28. The slit 34 along one side of the body portion 24A affords easy bending of the body portion 24A from the main body 24, as best seen in FIG. 3.

A pair of holding arms or extensions 36 and 38 on the body 24A and in a common plane therewith, as shown in FIG. 3, pierce the insulator board *d* and, when peened or bent over, engage various ones of the conductive strips 19 to provide electrical connection between the conductive strips 19 and the contacts E. The contact legs 12 and 14 of the electrical contacts B interfit with the legs 26, 28 of their respectively aligned contacts E, on the board D the legs of the respective interfitting contacts being disposed in planes at an angle of 90° relative to each other.

Although my invention has been described in considerable detail, such description is intended as being illustrative rather than limiting, since the invention may be variously embodied, and the scope of the invention is to be determined as claimed.

I claim as my invention:

1. An electrical contact adapted to be secured to a support, said contact comprising a contact portion, a body portion and a holding portion, said contact portion being a continuation of said body portion and lying in a common plane therewith, said contact including a substantially transverse slit, said holding portion being a continuation of said body portion but being disposed in a plane different from the plane of said body portion, said holding portion being delineated from said contact portion along said slit and from said body portion along a common bend line and at least one mounting leg extending laterally from said holding portion whereby said contact will be angularly related to said support at an angle other than a right angle.

2. An electrical contact comprising a member having a body portion at one end and a bifurcated contact portion at the opposite end, said contact having a substantially transverse slit partially thereacross, said body portion comprising first and second parts, said first part being a continuation of said contact portion and lying in a common plane therewith, said slit separating said contact portion from said second part of said body portion and said second part being disposed in a second plane angularly related to the plane of said first part, and a plurality of mounting legs extending laterally from said second part in the plane thereof.

3. An electrical contact member according to claim 2 wherein said common plane and second plane have an angular relationship of substantially 135°.

4. An electrical contact mtmber according to claim 2 wherein said mounting legs are spaced from each other in said second plane along the length of said body portion.

5. The combination of a printed circuit board and a mating connector member, at least one pair of electrical contacts comprising a first contact mounted on said printed circuit board and a second contact mounted on said connector member, said first contact including at one end a body portion with a holding portion, and a contact portion at the opposite end, said contact portion being disposed at an obtuse angle with respect to said holding portion, said holding portion having mounting means extending laterally therefrom for securing said first contact to said printed circuit board whereby said contact portion thereof will be positioned at an acute angle with respect to said printed circuit board, said second contact including a contact portion mating with said contact portion of said first contact.

6. The invention of claim 5 wherein said first-named contact portion is bifurcated.

7. The invention of claim 5 wherein said first-named contact portion is positioned at a 45° angle with respect to said printed circuit board.

8. The invention of claim 5 wherein said mating connector member is a second printed circuit board with said second contact member mounted thereon.

9. The combination of claim 8 wherein said printed circuit boards are disposed in planes substantially perpendicular to each other.

References Cited in the file of this patent

UNITED STATES PATENTS

| | | |
|---|---|---|
| Re. 23,547 | Fox | Sept. 9, 1952 |
| 2,086,641 | Riley | July 13, 1937 |
| 2,664,552 | Ericsson et al. | Dec. 29, 1953 |
| 2,750,572 | Fox | June 12, 1956 |
| 2,832,013 | Pedersen et al. | Apr. 22, 1958 |
| 2,946,976 | Blain | July 26, 1960 |
| 2,994,056 | Fox | July 25, 1961 |

FOREIGN PATENTS

| | | |
|---|---|---|
| 791,913 | Great Britain | Mar. 12, 1958 |

OTHER REFERENCES

Buggie, H. H., Inc.: EC Series Catalog (1954), page 4.

Ruehlemann, H. E.: Electronic Industries, October 1956, pages 62, 63, 158, 159 (copy in Scientific Library).

Elco (Elcotronic News, Special Report to Engineers), March 1957.

Disclaimer 3,149,894.—*Benjamin Fox*, Wyncote, Pa. ELECTRICAL CONTACT FOR PRINTED CIRCUIT BOARD. Patent dated Sept. 22, 1964. Disclaimer filed Feb. 28, 1966, by the assignee, *Elco Corporation.*

Hereby enters this disclaimer to claims 1 to 9 of said patent.

[*Official Gazette May 31, 1966.*]